United States Patent [19]

Birchall et al.

[11] 3,950,177

[45] *Apr. 13, 1976

[54] REFRACTORY COMPOSITIONS

[75] Inventors: James Derek Birchall; John Edward Cassidy, both of Runcorn, England

[73] Assignee: Imperial Chemical Industries Limited, London, England

[ * ] Notice: The portion of the term of this patent subsequent to Apr. 16, 1991, has been disclaimed.

[22] Filed: Nov. 29, 1973

[21] Appl. No.: 420,077

Related U.S. Application Data

[63] Continuation of Ser. No. 324,840, Jan. 18, 1973, abandoned, which is a continuation of Ser. No. 121,548, March 5, 1971, abandoned.

[30] Foreign Application Priority Data

Mar. 16, 1970 United Kingdom............... 12544/70
Dec. 11, 1970 United Kingdom............... 59032/70
Dec. 11, 1970 United Kingdom............... 59046/70

[52] U.S. Cl..................................... 106/55; 106/65

[51] Int. Cl.$^2$........................................ C04B 35/66
[58] Field of Search................... 106/55, 57, 65, 85

[56] References Cited

UNITED STATES PATENTS

| | | | |
|---|---|---|---|
| 2,455,758 | 12/1948 | Greger.................................. | 106/85 |
| 3,804,648 | 4/1974 | Birchall et al. ....................... | 106/56 |

*Primary Examiner*—J. Poer
*Attorney, Agent, or Firm*—Cushman, Darby & Cushman

[57] ABSTRACT

A complex suitable for making shapes used as moulds and bricks, for preparing coatings and for use as cements, fillers and the like comprising a halogen-containing complex phosphate of aluminum wherein the gram atom ratio of aluminum to phosphorus is substantially 1:1 and containing at least one chemically-bound molecule of water and/or chemically-bound oxygen-containing organic molecules, as binder.

9 Claims, No Drawings

REFRACTORY COMPOSITIONS

This is a continuation of application Ser. No. 324,840, filed on Jan. 18, 1973, now abandoned, which application is in turn a continuation of application Ser. No. 121,548, filed on Mar. 5, 1971, now abandoned.

This invention relates to refractory compositions.

According to the invention there is provided a composition which comprises a refractory material, a halogen-containing complex phosphate of aluminium containing one or more chemically-bound molecules of water and/or one or more chemically-bound oxygen-containing organic molecules, as binder, and a dispersant for said complex phosphate, the complex phosphate being present in an amount of 0.5 to 25% by weight of the composition.

Preferably the complex phosphate is present in an amount of 2 to 10% by weight of the composition.

The compositions may be used for a wide range of purposes, including the production of shaped articles (especially by moulding) and also for purposes in which the hardening of the composition and its adhesion to its surroundings can be utilised, as for example as a coating composition, a ramming mix, a pressing mix, or as a mortar, cement or filler for example for binding ceramics but especially for use at high temperature applications, for example in furnace walls and linings. The proportions of the components and the consistency of the mixes may be chosen to make them of optimum value for the use intended. The shaped articles which may be produced from them include bricks (for example furnace bricks), moulds, especially casting moulds; and sheets and other monoliths, for example monolithic linings for high temperature applications.

The invention thus also provides a process for making a solid shape which comprises forming a shape from a composition defined above and treating the formed shape to set it.

Generally the formed shape is treated by heating, e.g. to temperatures of 80° to 1200° C. Suitably the formed shape in its "green" state is first dried, e.g. at a temperature of 80° to 250° C before being transferred to a furnace for high temperature firing.

The invention further provides a process for protecting substrates, especially for imparting fire-resistance, which comprises coating them with a refractory composition as defined above.

The complex phosphates of aluminium which may be used for the purposes of this invention are described in U.K. Application No. 29862/69 corresponding to U.S. application Ser. No. 42,499, now abandoned and refiled as application Ser. No. 274,964, and may be made by the methods also described therein.

Suitable oxygen-containing organic molecules include hydroxy compounds, esters, aldehydes and ketones; preferred oxygen-containing organic molecules are ones which form coordination compounds with aluminum salts. Preferred hydroxy compounds are aliphatic alcohols, for example aliphatic alcohols containing 1 to 10 carbon atoms; it is especially preferred to use aliphatic alcohols containing from 1 to 4 carbon atoms, for example ethyl alcohol.

The halogen in the halogen-containing complex phosphate of aluminium (hereinafter referred to as the complex phosphate) is preferably chlorine, but the compounds may contain other halogens, for example bromine or iodine. The term "phosphate" includes a phosphate ester.

The ratio of the number of gram atoms of aluminium to the number of gram atoms of phosphorus in the complex phosphate may vary over a wide range, for example from 1:2 to 2:1, more especially 1:1 to 2:1, but is preferably substantially 1:1 as complex phosphates having this ratio decompose at low temperatures directly to form aluminium orthophosphate having greater chemical stability and refractoriness than aluminium phosphate formed from complex phosphates with other ratios. The ratio of the number of gram atoms of aluminium to the number of gram atoms of halogen in the complex phosphates is preferably substantially 1:1.

The complex phosphates may be monomeric or polymeric. Their structure is not fully understood and some of the chemically-bound hydroxy compounds may be bound as group —OR rather than as complete molecules.

The monomeric forms, or the repeating units of the polymeric forms of the complex phosphates, may contain, for example, from one to five molecules of the hydroxy compound. Most frequently the number of molecules of the hydroxy compound is 4. In some cases the complex phosphates may contain molecules of different hydroxy compounds, for example they may contain both chemically-bound water and a chemically-bound organic hydroxy compound, the total number of such molecules being, for example, from 2 to 5.

Examples of complex phosphates include:

a. that containing ethyl alcohol and having the empirical formula $AlPClH_{26}C_8O_8$. The infra-red and X-ray characteristics of the compound are described in Example 1 of the aforesaid application. It is designated aluminium chlorophosphate ethanolate, and for convenience is referred to herein as ACPE;

b. that having the empirical formula $AlPClH_{11}O_9$. The infra-red and X-ray characteristics of the compound are described in Example 6 of the aforesaid application. It is designated aluminium chlorophosphate hydrate, and for convenience is referred to as ACPH;

c. that containing bromino and ethyl alcohol having an empirical formula $AlPBrH_{25}C_8O_8$. The infra-red and X-ray characteristics of the compound are described in Example 7 of the aforesaid application. It is designated aluminium bromophosphate ethanolate, and for convenience is referred to as ABPH.

It is to be understood, however, that these designations in no way imply any particular molecular structures for the compounds.

The complex phosphates and their solutions may be prepared by reacting aluminium or an aluminium compound, preferably a halide, with a hydroxy compound R—OH and phosphoric acid, a phosphoric acid ester or a compound capable of forming phosphoric acid or a phosphoric acid ester. The preparation is preferably carried out at a temperature between 0° C and 50° C, and complex phosphate in which R—OH is water can be made by treating with water the complex phosphates in which R—OH is an organic hydroxy compound.

Suitable refractory materials include silica; alumina, e.g. tabular alumina and bauxite; magnesium, calcium and titanium oxides; zinc and tin oxides; magnesite; mag-chrome grog; zirconium silicate, zircon; aluminium silicates, e.g. sillimanite, andalusite, hyanite, mullite and molochite; porcelain and china clays; carbides, e.g. silicon and tungsten carbide; nitrides, e.g. silicon and boron nitride; boron; asbestos; ferric oxide; chromium oxide; chromite; mica; aluminium phosphate; and mixtures thereof.

The refractory material may be in any suitable form depending on the use to which the composition is to be put. Generally it is in the form of a powder but it may also be in the form of for example fibres, chips and flakes.

The particle size of refractory powder may be varied over a wide range; for example, it may be desired to use a coarse powder whose particle size substantially falls within the range of 0.35 to 1.0 mm, or a fine powder substantially the whole of which has a particle size of less than 0.05 mm. Mixtures of coarse and fine powders are preferred in some embodiments. For example, for moulds used in investment casting, it is preferred to use a refractory powder at least 50% by weight of which has a particle size of less than 0.15 mm and more preferably less than 0.075 mm.

The dispersant, generally a liquid dispersant, is preferably a solvent for the complex phosphate although the binder may be dispersed in the dispersant, for example, as a suspension, sol or gel.

Suitable solvents for the complex phosphate are disclosed in our aforesaid application, and are preferably polar solvents, e.g. methyl alcohol, ethyl alcohol, isopropyl alcohol, butyl alcohol, ethylene glycol, monoethyl ether, water or a mixture of two or more such solvents. A mixture of solvents may be used, for example a mixture of chloroform with methanol.

If desired, the solvent (for example alkanol) may be the one in which the complex phosphate has been made. The complex phosphate need not be isolated before conversion into the compositions of the present invention, and the crude reaction mixture in which it is made can be used directly, if desired, after appropriate removal of excess components or addition of extra components, for example the solvent.

In many applications it may be desirable to form a gel of the binder in the dispersant to which is added the refractory material to form a viscous and even thixotropic composition which is particularly suitable as a ramming or shulking mix. If desired the compositions may be gelled after addition of the refractory material. Alternatively, the composition may, if desired, contain a minor proportion, for example from 1 to 10%, preferably 5 to 10% by weight of a basic substance, preferably a weak base to assist gelling of the composition; preferred basic substances comprise an organic amine or a basic metallic oxide, for example calcium oxide or especially magnesium oxide. It will be understood that the refractory powder may be a basic material, for example magnesia, and that gelling will be assisted by the presence of the refractory powder itself.

The relative quantities of refractory material, binder and dispersant may vary over wide ranges, depending for example on the consistency of the composition that is required. Thus the composition may suitably comprise refractory material in an amount of 1 to 80% by weight of the composition and dispersant in an amount of 0.5 to 50% by weight of the composition.

The compositions may in addition to the complex phosphate comprise one or more other binders. Examples of such binders include silicates, e.g. alkyl silicates, such as ethyl or isopropyl silicate, aminoalkyl silicates, monoethanolamine orthosilicate, alkali metal silicates such as sodium and/or potassium silicate; silica sols; metal oxychlorides such as aluminium oxychloride; gypsum/silica mixes and cements such as aluminous or Portland cement. Further the compositions may include two or more different complex phosphates as binder.

The compositions of the invention may include a wide variety of other additives. Thus they may include a small quantity of a surface-active agent in an amount of for example 0.1 to 2% by weight of the composition, for example sodium lauryl sulphate, cotyl pyridinium bromide or polyethylene oxide condensates.

The compositions may include various substances to aid plasticity particularly those to be used as ramming mixes. Examples of such substances include, e.g. bentonite and clay substitutes such as cellulose ethers, e.g. methyl cellulose, ethyl cellulose, ethyl methyl cellulose, hydroxyethyl methyl cellulose and hydroxypropyl methyl cellulose. The proportion of such additives may be for example from 0.01 to 5% by weight.

The composition may also include small quantities, e.g. 0.1 to 5% by weight of corrosion inhibitors, e.g. chromic oxide or "Rodino".

Optionally, the compositions may contain additives which may modify the structure of the aluminium phosphate formed when the complex phosphate is heated. Examples of such additives are boric acid esters and ethers and organic compounds of metals such as titanium, zirconium or tin.

If desired the compositions may contain an organic polymer particularly when being used as a coating composition. The polymer is preferably one that is soluble in the dispersant and is preferably also an organic polymer which is thermally stable at a temperature of 120° C, more preferably at 200° C. Examples of useful organic polymers include polymethyl methacrylate, hydroxypropyl cellulose, epoxy resin, urea formaldehyde resin or organo-silanes. The polymer may be produced in situ in the composition by including the appropriate monomer in the composition and polymerising it by any convenient method, for example, irradiation by ultra-violet light, free-radical initiation or heating.

Other additives may include pigments, suspension agents and viscosity modifiers.

The compositions may be made if desired by mixing the constituents together. As stated above it is not necessary to isolate the complex phosphate as a solid but it may be formed in a solution or other dispersion and the remaining constituents of the composition added to this dispersion, opptionally with further or other dispersants.

The solid shapes which the compositions are particularly suitable for making are casting moulds.

Preferred compositions for making moulds contain 10 parts by weight of binder and from 1 to 80 parts by weight of refractory filler, especially 10 to 40 parts by weight of refractory filler. A composition suitable for application to a mould pattern by brushing or dipping may conveniently have proportions in parts by weight in the following ranges:

| | |
|---|---|
| complex phosphate | 5–15 |
| solvent | 10–40 |
| refractory powder | 100–150 |

Moulds may be made in the green state by building up a layer of a composition of the invention around a pttern; in the case of investment casting an expendable pattern is used, for example one made from wax or polystyrene. It is preferred to coat the pattern first with a composition in which at least 75% by weight of the refractory material has a particle size less than 0.075 mm, at least 25% by weight has a particle size of less than 0.05 mm. The mould may be built up by adding successive layers of composition, for example by spraying or dipping. Optionally, refractory powder, preferably coarse refractory powder, may be interposed between each layer. The process of building-up is continued until a mould of sufficient thickness has been formed. The mould may also be formed by pouring the composition around a pattern while the latter is secured within a moulding box, which may be vibrated, if desired, to assist packing of the refractory particles around the pattern. The mould material may be subjected to reduced pressure in order to eliminate entrapped air.

The mould material may, with advantage, be treated with a gas which reacts with the binder to form a gel, for example ammonia; such treatment may be carried out on one or more layers of the composition while the mould is being built up or it may be carried out on the complete green mould.

The green mould may be dried before firing in a stream of air or by heating at a moderate temperature, for example up to 150° C. If an expendable pattern is used and it is of sufficiently low melting point, it may be drained in its molten state from the mould. This may be achieved by shock heating the mould, e.g. to a temperature of at least 750° C, preferably 900° to 1100° C. Such heating may be continued to cure the mould. Alternatively the mould may be treated with steam, preferably dry steam at above atmospheric pressure, e.g. from 2 to 10 atmospheres. An expendable pattern may also be removed by dissolving it in a suitable solvent, for example trichloroethylene or perchloroethylene.

We have found that in many instances the treatment with solvent is sufficient to cure the mould to a sufficiently strong state for many applications without the need for further curing.

However, generally the moulds are cured by heating at temperatures of at least 80° C, for example in the range 150° to 1500° C, preferably 800° to 1200° C, for a time sufficient to harden them, e.g. from 5 to 60 minutes. An expendable pattern, or remnants thereof, may be substantially completely removed during firing.

In many cases it is desirable during the build up of the mould to treat one or more layers with a hydrophobic substance, for example an alkyl silicate in a suitable solvent, e.g. an alcoholic solution of ethyl silicate, or a silane in a suitable solvent, e.g. an alkyl alkoxysilane, such as methyl triethoxysilane, in an alcohol such as isopropyl alcohol.

This is particularly desirable when the layers are air dried and the mould is to be exposed to steam.

We find that the compositions according to the invention are more stable and may be stored for longer periods than those used hitherto. The solvents used in many preferred compositions allow the pattern to be wetted effectively and thereby provide a more faithful reproduction of the pattern surface on the mould interior.

If desired the compositions may be foamed to form light-weight solid shapes having a cellular structure. Thus the compositions may also incorporate foaming and/or blowing agents. Examples of suitable foaming agents include various surface-active agents, e.g. cationic, anionic and non-ionic detergents including those sold under the trade names "Aphrosol", "Komet-Extrakt", "Sthamex" and "Gloquat". Alternatively or additionally, a suface-active agent having a highly-fluorinated chain may be used as the foaming agent. Examples of the foregoing are illustrated in copending U.S. applications Ser. Nos. 26,158, now abandoned, 195,507 and 157,736, now abandoned. As blowing agents there may be used any of the conventional agents such as fluorocarbon propellants and other volatile organic compounds as well as inorganic substances such as sulphur hexafluoride, carbon dioxide, argon or nitrogen.

The blowing agent may be generated in situ. For example, when the binder is acidic, as for example it may be in the case of the complex phosphates, a basic substance such as magnesium carbonate, may be incorporated which will react with the complex phosphate on mixing in the dispersant. When the dispersant is an organic liquid, reaction to form carbon dioxide is suitably controlled. Unreacted magnesium carbonate on heating forms a refractory magnesium oxide.

When the compositions are used as coating compositions they may be applied to the substrate by conventional means, for example by dipping, spraying or brushing. The substrate may be in particular a metal, but may be any other desired substrate and in any form.

It is preferred that this application be carried out in an atmosphere having a relative humidity of less than 50%. When dipping is used, it is preferred to immerse the substrate in the composition and withdraw it slowly. Removal of solvent is preferably brought about by drying, either by heating the applied composition and/or subjecting it to a vacuum. Low boiling solvents such as methanol may be removed readily by standing the substrate to which the composition has been applied in warm air. When water comprises the solvent, drying in an oven at a temperature of at least 100° C is convenient.

The deposited coating is preferably heated, conveniently after removal of the solvent, to convert the complex phosphate of aluminium to aluminium phosphate or a deposit containing aluminium phosphate. The duration of the heating is preferably at least 10 minutes. The form of aluminium phosphate will depend, amongst other things, upon the temperatures to which the coating is heated, although a temperature of at least 80° C is sufficient to form a coat of aluminium phosphate. Preferably the coating is heated to a temperature from 100° to 200° C. Heating of the coating to form aluminium phosphate may be combined with the removal of solvent in a single operation. For example, if ethyl cellosolve is used as the solvent for the complex phosphate, removal of the solvent at its boiling point, namely 135° C, will also effect the heating of the deposit. When, however, the solvent is removed at a temperature of less than 80° C, further heating of the coating at a temperature of at least 80° C is usually necessary to bring about the formation of aluminium phosphate.

When the refractory material is mica it is desirable to use mica flakes or ground mica. This may suitably be suspended in a solution of the binder, e.g. ACPE in methanol. The composition may then be drained through a fine mesh or filter, for example of paper thereby forming a sheet of mica comprising particles coated with binder. This may then be heated, e.g. to 80° to 250° C, to form a sheet of mica bound with aluminium phosphate. This product is especially useful as it is effectively a form of reconstituted mica and can be used as sheet mica. Suitably, the mica flakes have a size of 0.5 to 5 mm and comprise 0.5 to 10% by weight of the composition.

The invention also provides a dry formulation suitable for preparation of the compositions of the invention which comprises a mixture of a refractory material with the solid halogen-containing complex phosphate of aluminium described above.

As mentioned above, the preferred complex phosphates are those designated ACPE and ACPH. These compounds are stable in air and so can form stable dry formulations which may be mixed with a suitable dispersant prior to use of the compositions of the invention.

The invention is illustrated in the following examples in which all parts and percentages are by weight, unless otherwise stated.

EXAMPLE 1

40 gram of anhydrous aluminium chloride was added to 300 ml of laboratory grade of ethyl alcohol. The resultant solution was cooled to 0° C and 18.6 ml of 88% orthophosphoric acid was added to it in a dropwise manner and the reaction mixture stirred. The reaction was carried out in an atmosphere of dry nitrogen. The white crystalline material formed was separated from the mixture, washed with ethanol and dried under vacuum at a temperature of 0° C. 70 gram of product was obtained.

The product compound had the empirical formula $AlPClH_{25}C_8O_8$ (hereinafter referred to as ACPE) and on a dry basis gave the following chemical analysis (expressed as a percentage by weight):

| Al | P | Cl | C | H |
|---|---|---|---|---|
| 7.87 | 9.04 | 10.34 | 28.03 | 7.35 | and contained 53.78% of chemically-bound ethyl alcohol. The infra-red absorption spectrum of the compound containing a trace of water was measured using the liquid paraffin mull technique. The principal band positions are given in Table 1 which indicates the relative strengths of the bands.

Table 1

| Band positions in reciprocal centimeters | | | |
|---|---|---|---|
| 3450 | strong | 970 | weak |
| 1920 | weak | 935 | weak |
| 1635 | weak | 900 | medium strong |
| 1230 | very strong | 870 | medium strong |
| 1100 | strong | 800 | weak |
| 1075 | strong | 715 | medium strong |
| 1030 | very strong | | |

The X-ray powder data were also obtained for the compound containing a trace of water, using a Philips powder camera, CuKα radiation and a nickel filter. The intensities were obtained by visual observation. The data obtained are shown in Table 2.

Table 2

| dA° | I/Io | dA° | I/Io | dA° | I/Io |
|---|---|---|---|---|---|
| 10.7 | vs | 2.94 | vw | 2.097 | vvw |
| 7.2 | vw | 2.89 | vvw | 2.034 | vvwb |
| 6.25 | w | 2.81 | w | 1.967 | vvwb |
| 5.24 | w | 2.72 | vvw | 1.951 | vvw |
| 4.87 | w | 2.64 | vw | 1.899 | vvw |
| 4.57 | vw | 2.60 | vvw | 1.866 | vvw |
| 4.04 | m | 2.54 | vvw | 1.786 | vvw |
| 3.62 | s | 2.489 | vw | 1.660 | vvw |
| 3.44 | s | 2.460 | vvw | 1.627 | vvw |
| 3.25 | vvw | 2.279 | vw | 1.594 | vvw |
| 3.18 | vw | 2.236 | vvw | 1.553 | vvw |
| 3.11 | vvw | 2.174 | vvw | 1.528 | vvw |
| 3.02 | w | 2.132 | vvw | | |

A differential thermal analysis was carried out on a sample of the compound which contained a small quantity of water. The thermogram covered the range 0°–800° C and was carried out under nitrogen. Sharp endothermic peaks at 82° and 96° C and a broad endothermic inflection at approximately 175° C was observed.

A 24% solution of the product (ACPE) in isopropyl alcohol was prepared and 22.5 parts of this solution were intimately mixed with 99 parts of powdered zirconium silicate, substantially the whole of which had a particle size of less than 0.075 mm.

Six coats of the resulting composition were applied to a wax pattern by repeated dipping and air-drying. A light coat of fine zirconium silicate powder was applied to each coat. Each coat was touch-dry within about 30 seconds, and the complete green mould was complete in 20 minutes. The mould was sufficiently strong to withstand normal workshop handling.

The green mould was suspended in trichloroethylene vapour in a degreasing bath until all the wax pattern had been removed. The mould was fired at 1000° C for 1 hour, after which time it was very strong and withstood further heating to 1650° C without apparent change.

EXAMPLE 2

27 parts of a 24% solution of ACPE in isopropyl alocohol were mixed with 100 parts of powdered alumina, substantially all of which had a particle size of less than 0.075 mm. A very even suspension of creamy consistency was obtained.

Six coats of this suspension were applied to a wax pattern in the same way as described in Example 1 and the resultant dry green mould fired at 1000° C for half-hour. The fired mould withstood prolonged heating at a temperature of 1750° C without detectable change.

Six coats of the suspension were applied to a further wax pattern, and each coat was exposed to ammonia gas for a few seconds. Very rapid gelling of the coat was achieved. The green mould was very strong. Firing at 1000° C for half-hour produced a mould which withstood a temperature of 1650° C for 1 hour.

EXAMPLE 3

22.5 parts of the 24% solution of ACPE in isopropyl alcohol were mixed with 40 parts of powdered silica, substantially all of which had a particle size of less than 0.075 mm.

Six coats of the resulting slurry were applied to a wax pattern by repeated dipping and drying between coats. A light coat of silica powder of particle size in the range 0.17 mm to 0.25 mm was applied to the first coat; to subsequent slurry coats a light coat of silica powder of particle size in the range 0.25 mm to 0.6 mm was applied. The complete green mould was completed in about 20 minutes, and then suspended in trichloroethylene vapour in a degreasing bath until all trace of the wax pattern had been removed. The mould was then fired at 1000° C for half-hour, giving a strong finished mould which withstood a further heating to 1500° C.

A stainless steel comprising 18% Cr, 10% Ni, 3% Mo and 0.6% Ti was successfully cast in this mould at a pouring temperature of 1580° C.

EXAMPLE 4

11 parts of 30% solution of ACPE in butyl alcohol was mixed with 30 parts of a tabular alumina substantially the whole of which had a particle size less than 0.044 mm.

A wax pattern was coated with six coats of the resulting suspension, each coat being touch-dry in air after about two minutes. A light coat of fine alumina powder was applied to each coat.

The green mould was heated rapidly to 1000° C to melt out the wax pattern and then fired at 1000° C for half-hour to give a finished mould which was very strong and resistant to a temperature of 1650° C.

EXAMPLE 5

31 parts of a 24% solution of ACPE in isopropyl alcohol was mixed with 100 parts of a tabular alumina, substantially the whole of which had a particle size less than 0.044 mm.

A wax pattern was coated with a coat of the slurry and then with six further coats to each of which a stucco coat of tabular alumina having a particle size of 0.3 mm to 0.6 mm was applied. Each stucco coat was exposed to ammonia gas for a few seconds. Finally a further coat of slurry was applied.

The mould was then treated with trichloroethylene vapour until all the wax was removed, and then fired at 1000° C for half-hour.

Stainless steel as described in Example 3 was successfully cast in this mould at a pouring temperature of 1580° C.

The Example was repeated using 25% and 20% solutions of ACPE in isopropyl alocohol as well as 15% solutions in isopropyl alcohol mixed with 6% water and a 15% aqueous solution of ACPE. Similar beneficial results were obtained.

EXAMPLE 6

Example 5 was repeated using a 15% solution of ACPE in isopropyl alcohol together with 1.5% by weight of the composition of ethyl silicate. The flexural strength of the resultant mould was 25 to 30% greater than the moulds prepared in Example 5.

EXAMPLE 7

A slurry was formed from 39 parts of a 15% solution of ACPE in water and 100 parts of tabular alumina, substantially all of which had a particle size less than 0.044 mm, together with 0.15% of a surfactant sold under the Trade Name Lissopol NX.

A wax pattern was coated with three coats of slurry which were allowed to air-dry followed by a stucco coat of tabular alumina having a particle size of 0.35 mm to 0.7 mm and then four further coats of slurry with alternate stucco coats of tabular alumina having a particle size of 0.7 mm to 1.4 mm and a final coat of slurry.

The mould was then treated with trichloroethylene vapour to remove all the wax and to cure the mould. The resultant mould was fairly strong. Similar results were obtained using perchloroethylene instead of trichloroethylene. The moulds were then further fired at 1000° C for half-hour to give a mould which was used to give a satisfactory casting of nickel alloy comprising 8% Cr, 4.5% Ti, 5.0% Al, 13.0% Co, 2.0% Mo and 0.7% V, which was poured at 1650° C under vacuum.

EXAMPLE 8

A slurry was formed from 48.5 parts of a 15% solution of ACPE in isopropyl alcohol containing 6% water together with 100 parts of calcined alumina, substantially all of which had a particle size less than 0.044 mm.

A wax pattern was coated with a coat of the slurry and then with a stucco coat of ground alumina having a particle size less than 0.25 mm. This was followed by nine secondary coats of slurry with alternate secondary stucco coats of ground alumina having a particle size less than 0.35 mm finally ending with a coat of slurry. Each secondary stucco coat was exposed to ammonia gas for a few seconds.

The mould was then treated with dry steam at a pressure of 5.6 kg/cm$^2$ gauge until all the wax had been removed. The green mould was then fired at 1000° C to give a strong, hard finished mould.

EXAMPLE 9

Example 8 was repeated except only five secondary coats were applied and instead of treatment with ammonia each secondary stucco coat was air-dried and then treated by dipping in a 40% alcoholic solution of ethyl silicate.

The finished mould was strong and hard.

EXAMPLE 10

A slurry was formed from 40 parts of a 16% solution of ACPE in isopropyl alcohol containing 6% water together with 100 parts of fused silica having a particle size less than 0.075 mm.

A wax pattern was coated with a coat of slurry to which was then applied a stucco coat of fused silica having a particle size of 0.17 mm to 0.25 mm.

Five secondary coats of a slurry made from 42 parts of a 16% solution of ACPE in isopropyl alcohol together with 100 parts of molochite having a particle size less than 0.125 mm were then applied.

Each of these coats was followed by a stucco coat of molochite having a particle size of 0.2 to 0.5 mm, each of which was exposed to ammonia gas for a few seconds.

The mould was treated with dry steam at a pressure of 5.6 kg/cm$^2$ gauge until all the wax had been removed. The green mould was then fired at 900° C to give a strong, hard finished mould.

EXAMPLE 11

Example 10 was repeated except that instead of the treatment with ammonia each secondary stucco coat was air-dried and then treated by dipping in a 5% solution of methyl triethoxysilane in isopropyl alcohol with further air-drying.

The finished mould was strong and hard.

EXAMPLE 12

A wooden pattern was thinly coated with petroleum jelly and placed in a moulding box. In each of a series of experiments, a composition according to the invention was poured around the pattern to form a green mould. After standing for a sufficient time to allow the composition to gel the wooden pattern was removed. Each green mould was subsequently dried at 170° C in air and fired at 1000° C for half-hour.

The binder used in all compositions was a 24% solution of ACPE in isopropyl alcohol.

Varying amounts of micronised magnesia were added to all compositions to assist gelling.

The refractory filler materials used were:

A   Tabular alumina substantially all of which has a particle size less than 0.044 mm;
B   Tabular alumina of size between 0.3 mm to 0.6 mm;
C   Silica, of which all had a particle size less than 0.075 mm and 75% had a particle size less than 0.044 mm;
D   Silica, of which not more than 8% had a particle size less than 0.21 mm and less than 6% had a particle size greater than 0.84 mm.

The designations A, B, C and D are used to identify the refractory filler in Table 3.

Table 3 shows the compositions used for making the moulds and comments on the quality of mould produced.

Table 3

| Composition Number | Parts of Refractory Filler A B C or D | Parts of Magnesia | Binder (parts) | Time for gelling of composition (mins) | Quality of finished mould |
|---|---|---|---|---|---|
| 1 | A 150 | 15 | 51 | 10 | Good surface, but crazed |
| 2 | A 70, B 70 | 14 | 32 | 10 | Excellent |
| 3 | C 50, D 50 | 10 | 25.5 | 10 | Excellent |
| 4 | C 60, D 60 | 6 | 30 | 40 | Good |
| 5 | C 50, D 50 | 10 | 42.5 | 2–3 | Good |
| 6 | C 50, D 50 | 5 | 40 | 7 | Acceptable |
| 7 | C 50, D 50 | 10 | 42.5 | 2 | Good |

EXAMPLE 13

A wooden pattern was thinly coated with petroleum jelly and placed in a moulding box.

50 parts of magnesium oxide having a particle size less than 0.075 mm and 50 parts of magnesium oxide having a particle size less than 3 mm were mixed with 17 parts of a 24% solution of ACPE in isopropyl alcohol and the mixture poured around the pattern. The mixture gelled after 15 minutes and the pattern was removed. The green mould was dried by burning off the solvent and fired at 1350° C for half-hour to give a finished mould which was strong and hard.

EXAMPLE 14

The previous Example was repeated using a mixture of 200 parts of zirconium silicate having a particle size less than 0.075 mm, 10 parts of very fine "Analar" magnesium oxide and 42.5 parts of the 24% solution of ACPE in isopropyl alcohol. The mixture gelled after 4.5 minutes. The fired mould was strong and hard.

EXAMPLE 15

15.2 gram of anhydrous aluminium chloride was added slowly to 40 ml of distilled water. The resultant solution was cooled to ambient temperature and 7.4 ml of an 88% solution of orthophosphoric acid added to it with stirring. The solution was then concentrated by heating to a volume of about 20 ml. A viscous yellow-brown liquid was formed which, after several days' standing in a crystallising dish, produced a crop of crystals. The crystals were filtered off, washed with ethanol and dried in a vacuum desiccator. The chemical analysis of the crystals give aluminium 10.6% by weight, chlorine 14.5% by weight, phosphorus 12.4% by weight, water 40.1% by weight. This analysis corresponded well with the empirical formula $AlPClH_{11}O_9$. This compound is referred to hereafter as ACPH.

15 parts of a 50% aqueous solution of ACPH were mixed with powdered molochite (aluminium silicate) of the following size distribution:

45% of particle size 2 to 6 mm
10% of particle size 0.25 to 0.5 mm
45% of particle size less than 0.075 mm.

The mixture was placed in moulds to form 2.5 cm long cylinders having a diameter of 2.5 cm and compressed to a pressure of 500 kg/cm². The cylinders were left for 24 hours and then dried at 120° C. Similarly prepared cylinders were fired at a series of temperatures up to 1250° C.

For the purpose of comparison, cylinders were similarly prepared replacing the ACPH with aluminium dihydrogen orthophosphate.

The crushing strength of the cylinders after treatment at various temperatures is shown in the Table 4.

Table 4

| Temperature (°C) of Treatment | Crushing Strength (kg/cm²) | |
|---|---|---|
| | ACPH Binder | $Al(H_2PO_4)_3$ Binder |
| 120 | 97 | 55 |
| 500 | 110 | 101 |
| 1250 | 188 | 187 |

EXAMPLE 16

A dry powder formulation of the following composition was made up:

Molochite powder — 45 parts of particle size 2 to 6 mm

Molochite powder — 60 parts of particle size 0.25 to 0.5 mm

Molochite powder — 45 parts of particle size less than 0.075 mm.

This mix was then converted into a stiff paste by addition of water and was then formed into cylinders and heat-treated as in Example 15. The crushing strengths of these cylinders are shown in Table 5.

Table 5

| Temperature (°C) of Treatment | Crushing Strength (kg/cm²) |
|---|---|
| 120 | 50 |
| 1250 | 131 |

A similar dry powder mix could not easily be prepared with aluminium acid phosphate since this material is hygroscopic. The ACPH/molochite mix was stable and could be stored without deterioration.

We claim:

1. A dry composition suitable for the preparation of a refractory composition which comprises a dry mixture of a refractory material and from 0.5 to 25% of the composition of a halogen-containing complex phosphate of aluminium wherein the ratio of the number of gram atoms of aluminium to the number of gram atoms of phosphorus is substantially 1:1 and containing at least one chemically-bound molecule selected from the group consisting of water and oxygen-containing organic molecules.

2. A composition according to claim 1 in which the refractory material is in the form of a powder.

3. A composition according to claim 1 in which the complex phosphate is present in an amount of 2 to 10% by weight of the composition.

4. A composition according to claim 1 in which the oxygen-containing organic molecule of the complex phosphate is an aliphatic alcohol containing 1–4 carbon atoms.

5. A composition according to claim 5 in which the alcohol is ethyl alcohol.

6. A composition according to claim 1 in which the halogen of the complex phosphate is chlorine.

7. A composition according to claim 6 in which the complex phosphate contains four molecules of chemically-bound ethyl alcohol and has the empirical formula $AlPClH_{25}C_8O_8$.

8. A composition according to claim 6 in which the complex phosphate contains five molecules of chemically-bound water and has the empirical formula $AlPClH_{11}O_9$.

9. A composition according to claim 1 in which the refractory material is mica flake.

* * * * *